(12) United States Patent
Park et al.

(10) Patent No.: US 10,547,619 B1
(45) Date of Patent: Jan. 28, 2020

(54) USB DEVICE FOR NETWORK SECURITY

(71) Applicants: Young Hoon Park, Gimpo-si (KR);
Dae Yong Ji, Seoul (KR)

(72) Inventors: Young Hoon Park, Gimpo-si (KR);
Dae Yong Ji, Seoul (KR)

( * ) Notice: Subject to any disclaimer, the term of this patent is extended or adjusted under 35 U.S.C. 154(b) by 0 days.

(21) Appl. No.: 16/505,318

(22) Filed: Jul. 8, 2019

(30) Foreign Application Priority Data

Jul. 9, 2018  (KR) .......................... 10-2018-0079160

(51) Int. Cl.
*H04L 29/06* (2006.01)

(52) U.S. Cl.
CPC .................................. *H04L 63/10* (2013.01)

(58) Field of Classification Search
CPC ...................................................... H04L 63/10
See application file for complete search history.

(56) References Cited

U.S. PATENT DOCUMENTS

| | | | | |
|---|---|---|---|---|
| 7,644,211 B2* | 1/2010 | Toebes | ..................... | H04L 67/14 |
| | | | | 370/402 |
| 7,930,446 B2* | 4/2011 | Kesselman | ........... | H04L 47/805 |
| | | | | 370/392 |
| 8,316,228 B2* | 11/2012 | Winslow | ............. | H04L 63/0428 |
| | | | | 713/153 |
| 2006/0218320 A1* | 9/2006 | Avraham | ................ | G06F 21/55 |
| | | | | 710/62 |
| 2006/0218409 A1* | 9/2006 | Avraham | ............... | G06F 13/102 |
| | | | | 713/189 |
| 2009/0049307 A1* | 2/2009 | Lin | ......................... | G06F 21/72 |
| | | | | 713/185 |
| 2012/0079563 A1* | 3/2012 | Green | .................... | G06F 21/572 |
| | | | | 726/3 |
| 2016/0196454 A1* | 7/2016 | Soffer | .................. | H01R 13/443 |
| | | | | 726/16 |
| 2017/0124011 A1* | 5/2017 | Verdino | ................. | G06F 13/385 |
| 2017/0222964 A1* | 8/2017 | Hoffman | ................. | H04L 51/32 |
| 2019/0182157 A1* | 6/2019 | Barnes | .................. | H04L 45/745 |

FOREIGN PATENT DOCUMENTS

| | | |
|---|---|---|
| JP | 2009-070298 | 4/2009 |
| KR | 10-2007-0016029 | 2/2007 |
| KR | 10-2009-0062199 | 6/2009 |
| KR | 10-2011-0088245 | 8/2011 |

\* cited by examiner

*Primary Examiner* — Ali Shayanfar
(74) *Attorney, Agent, or Firm* — Norton Rose Fulbright US LLP

(57) ABSTRACT

An USB device includes: a wireless communication unit; a storage unit configured for storing a driving program, a driving application, a driving command, and/or data received from an external information device and/or a server therein; and a control unit configured for controlling the wireless communication unit, the storage unit, wherein the control unit includes: a data processor configured for controlling a data processing operation using the driving program, the driving application or the driving command; and a transmission controller configured for: receiving data from the information device under control of the data processor; and selectively allowing or disallowing data transmission from the data processor to the information device.

4 Claims, 6 Drawing Sheets

[FIG. 2B]
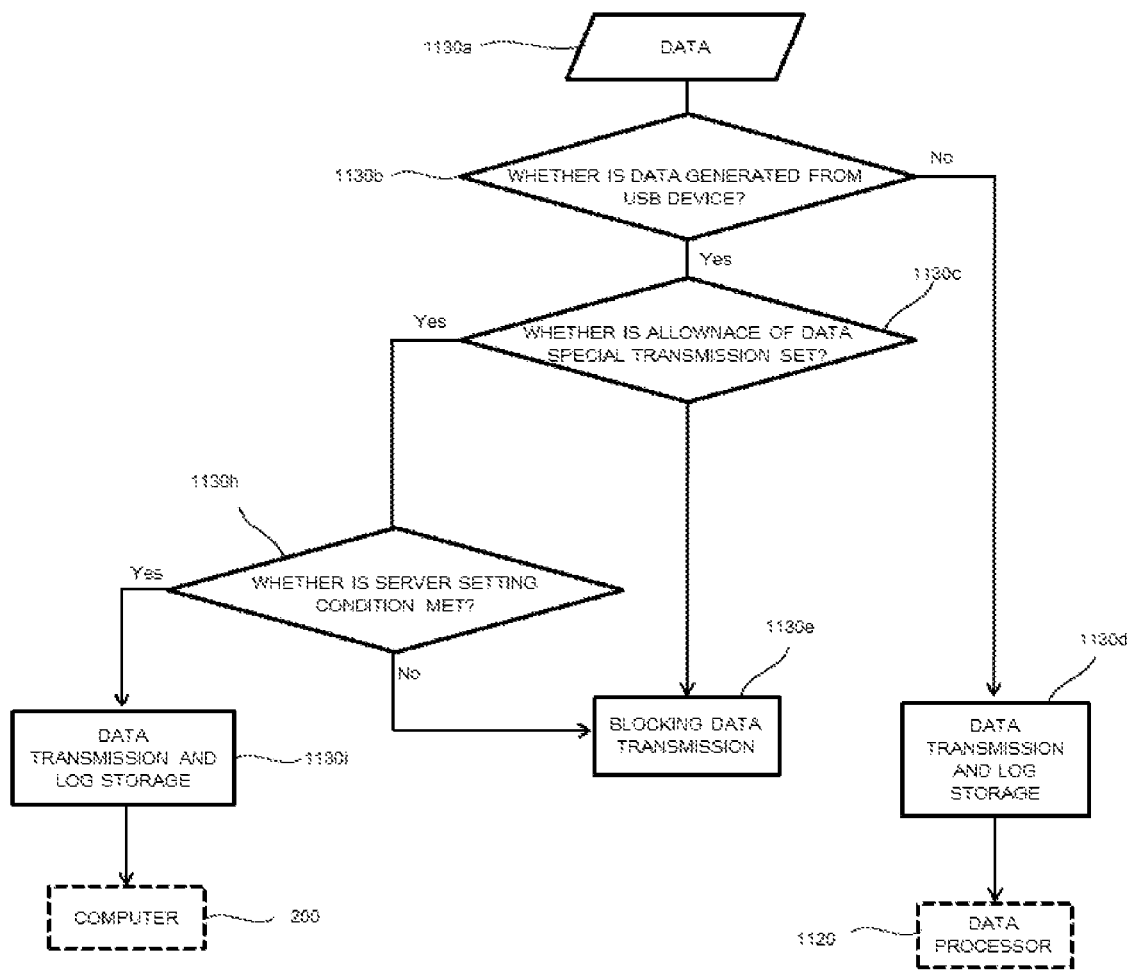

USB DEVICE FOR NETWORK SECURITY

CROSS-REFERENCE TO RELATED APPLICATION

This application claims a benefit under 35 U.S.C. § 119(a) of Korean Patent Application No. 10-2018-0079160 filed on Jul. 9, 2018, on the Korean Intellectual Property Office, the entire disclosure of which is incorporated herein by reference for all purposes.

BACKGROUND

1. Field

The present disclosure relates to a USB (Universal Serial Bus) device for network security that may be connected to an information device such as a computer to store information therein and to prevent automatic transmission of internal information therein to the information device.

2. Description of Related Art

A USB (Universal Serial Bus) device is a portable storage device that may be connected to an information device such as a computer to transfer or store data therein. The USB device is widely used because it is easy to carry and easy to manipulate the USB device.

However, when the USB device is connected to a computer or the like, and the information stored in the USB device is opened, the corresponding information is automatically recorded on the computer. Thus, the security is weak.

In modern society, interest and need for network security is increasing day by day. In this security field, it is necessary to prevent USB device internal information from being automatically recorded on a connected computer or the like even when USB device is connected to the computer or the like.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a USB device for network security that can prevent internal information in the USB device from being automatically recorded on a computer connected thereto even when the USB device is connected to the computer or the like.

In one aspect of the present disclosure, there is proposed a portable universal series bus (USB) device for network security, wherein the USB device is connected to an external information device and stores information therein, wherein the USB device includes: a wireless communication unit configured for transmitting and receiving data to and from an external server in a wireless communication manner; a first storage unit configured for storing a driving program, a driving application, or a driving command therein; a second storage unit configured for storing data received from the information device and the server therein; and a control unit configured for controlling the wireless communication unit, the first storage unit and the second storage unit using the driving program, the driving application, or the driving command, wherein the control unit includes: a communication controller configured for controlling wireless communication between the wireless communication unit such that the USB device performs data communication with the server; a data processor configured for controlling a data processing operation using the driving program, the driving application or the driving command, or using an application program or an application supplied from the information device; and a transmission controller configured for: receiving data from the information device under control of the data processor; and selectively allowing or disallowing data transmission from the data processor to the information device.

In one implementation, the transmission controller includes: an input unit configured for receiving data from the information device or the data processor; a first determination unit configured for determining, based on a first token including identifying information among tokens of the data received from the input unit, whether the received data is generated from the data processor or from the information device; a data transmission-disabling unit configured for blocking transmission of the data received from the first determination unit to the information device and for storing a log of the transmission-blocked data in the second storage unit; and a first data transmission unit configured for transmitting the data received from the first determination unit to the data processor and for storing a log of the transmitted data in the second storage unit, wherein when the first determination unit determines that the data received from the input unit is generated from the data processor, the first determination unit transmits the corresponding data to the data transmission-disabling unit, wherein when the first determination unit determines that the data received from the input unit is generated from the information device, the first determination unit transmits the corresponding data to the first data transmission unit.

In one implementation, the transmission controller includes: an input unit configured for receiving data from the information device or the data processor; a first determination unit configured for determining, based on a first token including identifying information among tokens of the data received from the input unit, whether the received data is generated from the data processor or from the information device; a second determination unit configured for receiving the data from the first determination unit and for determining whether allowance of data special transmission to the information device is set in the first storage unit or the second storage; a third determination unit configured for receiving the data from the second determination unit, and for receiving a server setting condition for the data special transmission from the server via the wireless communication unit, and then for determining whether the data received from the second determination unit satisfies the server setting condition; a data transmission-disabling unit configured for blocking transmission of the data received from the first determination unit or the third determination unit to the information device and for storing a log of the transmission-blocked data in the second storage unit; a first data transmission unit configured for transmitting the data received from the first determination unit to the data processor, and for storing a log of the transmitted data in the second storage unit; and a second data transmission unit configured for transmitting the data received from the third determination unit to the information device and for storing a log of the transmitted data in the second storage unit, wherein when the first determination unit determines that the data received from the input unit is generated from the information device, the first determination unit transmits the corresponding data to the first data transmission unit, wherein when the first determination unit determines that the data received from the input unit is generated from the data processor, the first determination unit transmits the corresponding data to the second determination unit, wherein when the second determination unit determines that the allowance of the data special transmission is not set, the second determination unit transmits the corresponding data to the data transmission-disabling unit; wherein when the second determination unit determines that the allowance of the data special transmission is set, the second determination unit transmits the corresponding data to the third determination unit, wherein when the third determination unit determines that the data received from the second determination unit satisfies the server setting condition, the third determination unit transmits the corresponding data to the second data transmission unit, wherein when the third determination unit determines that the data received from the second determination unit does not satisfy the server setting condition, the third determination unit transmits the corresponding data to the data transmission-disabling unit.

In one implementation, the server setting condition includes at least one selected from a group consisting of data transmission timing, data type, and data capacity.

In one implementation, the transmission controller includes: an input unit configured for receiving data from the information device or the data processor; a first determination unit configured for determining, based on a first token including identifying information among tokens of the data received from the input unit, whether the received data is generated from the data processor or from the information device; a second determination unit configured for receiving the data from the first determination unit and for determining whether allowance of data special transmission to the information device is set in the first storage unit or the second storage; a fourth determination unit configured for receiving the data from the second determination unit and for determining whether the USB device is connected to the server via the wireless communication unit; a third determination unit configured for receiving the data from the fourth determination unit, and for receiving a server setting condition for the data special transmission from the server via the wireless communication unit, and then for determining whether the data received from the fourth determination unit satisfies the server setting condition; a fifth determination unit configured for receiving the data from the fourth determination unit, and for receiving a user setting condition from the data processor, and for determining whether the data received from the fourth determination unit satisfies the user setting condition; a data transmission-disabling unit configured for blocking transmission of the data received from the first determination unit or the third determination unit to the information device and for storing a log of the transmission-blocked data in the second storage unit; a first data transmission unit configured for transmitting the data received from the first determination unit to the data processor, and for storing a log of the transmitted data in the second storage unit; and a second data transmission unit configured for transmitting the data received from the third or fifth determination unit to the information device and for storing a log of the transmitted data in the second storage unit, wherein when the first determination unit determines that the data received from the input unit is generated from the information device, the first determination unit transmits the corresponding data to the first data transmission unit, wherein when the first determination unit determines that the data received from the input unit is generated from the data processor, the first determination unit transmits the corresponding data to the second determination unit, wherein when the second determination unit determines that the allowance of the data special transmission is not set, the second determination unit transmits the corresponding data to the data transmission-disabling unit; wherein when the second determination unit determines that the allowance of the data special transmission is set, the second determination unit transmits the corresponding data to the fourth determination unit, wherein when the fourth determination unit determines that a connection between the server and the USB device is established, the fourth determination unit transmits the data received from the second determination unit to the third determination unit, wherein when the fourth determination unit determines that a connection between the server and the USB device is not established, the fourth determination unit transmits the data received from the second determination unit to the fifth determination unit, wherein when the third determination unit determines that the data received from the fourth determination unit satisfies the server setting condition, the third determination unit transmits the corresponding data to the second data transmission unit, wherein when the third determination unit determines that the data received from the fourth determination unit does not satisfy the server setting condition, the third determination unit transmits the corresponding data to the data transmission-disabling unit, wherein when the fifth determination unit determines that the data received from the fourth determination unit satisfies the user setting condition, the fifth determination unit transmits the corresponding data to the second data transmission unit, wherein when the fifth determination unit determines that the data received from the fourth determination unit does not satisfy the user setting condition, the fifth determination unit transmits the corresponding data to the data transmission-disabling unit.

In one implementation, the device further includes an authentication unit configured for storing authentication information therein, wherein the control unit transmits the authentication information to the server via the wireless communication unit to access the server, wherein upon confirming the authentication information, the server allows the USB device to connect thereto.

In one implementation, the second storage unit includes a volatile memory connected to the control unit, and a non-volatile memory connected to the volatile memory, wherein the volatile memory performs a buffer function to match a data transmission rate via the wireless communication unit with a data storage rate of the nonvolatile memory.

According to the present disclosure, the transmission controller of the control unit may transmit data generated from the computer connected to the USB device to an internal portion of the USB device. However, the transmission controller of the control unit may prevent the internal information generated from the USB device from being transmitted to the computer, although the transmission of the internal data to the computer is allowed only in an exceptional case. Thus, even when the USB device in accordance with the present disclosure is connected to the external computer, the internal information in the USB device may not be recorded on the external computer. This may significantly improve security.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 1 is a block diagram illustrating a USB device for network security according to an embodiment of the present disclosure.

FIG. 2A to FIG. 2C are flow charts illustrating embodiments of a transmission controller shown in FIG. 1.

DETAILED DESCRIPTIONS

Figure 1:
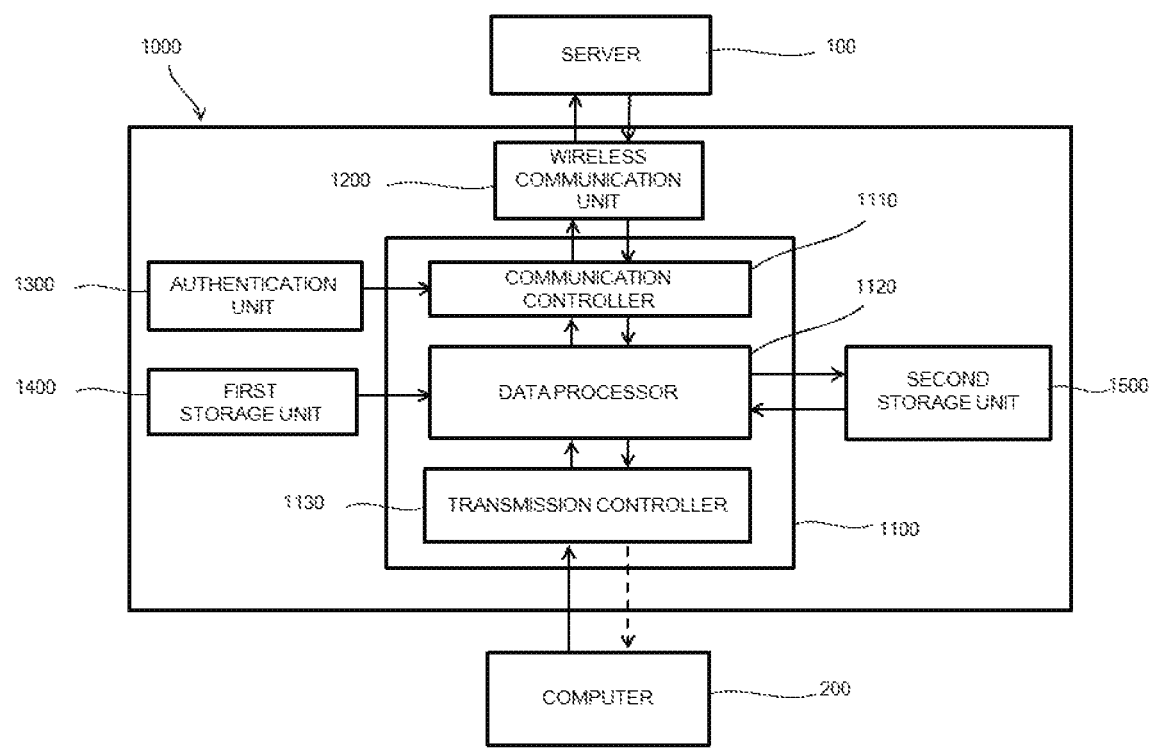

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a USB device for network security according to an embodiment of the present disclosure.

Referring to FIG. 1, the USB device 1000 for network security according to an embodiment of the present disclosure refers to a storage device being connected to information devices such as a computer, a notebook, and a tablet PC and capable of storing information therein. For convenience of description, by way of example, the information device is referred to as a computer. However, the present disclosure is not limited thereto. The computer described herein should be interpreted as including all types of information devices.

The USB device 1000 for network security according to an embodiment of the present disclosure includes a control unit 1100, a wireless communication unit 1200, an authentication unit 1300, a first storage unit 1400 and a second storage unit 1500.

The control unit 1100 may drive application programs, applications and control instructions stored in the first storage unit 1400 to control the wireless communication unit 1200, the authentication unit 1300, and the second storage unit 1500.

In one embodiment, the control unit 1100 may include a communication controller 1110, a data processor 1120, and a transmission controller 1130.

The communication controller 1110 controls wireless communication operations between a server 100 and the USB device 1000 for network security according to the present disclosure. The communication controller 1110 may perform data transmission/reception with the server 100. For example, the communication controller 1110 may control the operation of the wireless communication unit 1200 and the authentication unit 1300. Specifically, the communication controller 1110 transmits authentication information stored in the authentication unit 1300 to the server 100 in a mobile communication or wireless Internet communication manner to control connection between the USB device 1000 for network security according to the present disclosure and the server 100. Further, the communication controller 1110 may receive data from the server 100 or transmit data supplied from the data processor 1120 to the server 100 based on a control command from the data processor 1120.

The data processor 1120 may be configured to control an data processing operation using operating system and information, application programs, applications, control instructions stored in the first storage unit 1400 or using an application program, an application program, or the like provided from the computer 200 directly connected to the USB device 1000 for network security according to the present disclosure via the transmission controller 1130. In one example, the data processor 1120 may store data or programs supplied from the server 100 and the computer 200 into the second storage unit 1500.

The transmission controller 1130 may receive data from the computer 200 or prevent the data transmission from the USB device 1000 to the computer 200 for network security according to the present disclosure, based on the control command from the data processor 1120. However, in exceptional cases, for example, when there is an instruction from the server 100 or when the user's setting condition is satisfied, the transmission controller 1130 may transmit data from the data processor 1120 to the computer 200. The operation of the transmission controller 1130 will be described later with reference to FIG. 2.

The wireless communication unit 1200 may transmit and receive data to and from the server 100 in the wireless communication manner. The wireless communication unit 1200 may include a mobile communication module and a wireless Internet module.

The authentication unit 1300 may store authentication information such as MNO (Mobile Network Operator) information used in the wireless communication, and information necessary for other communication. The control unit 1100 may transmit authentication information stored in the authentication unit 1300 to the server 100 to access the server 100 via the wireless communication unit 1200. Upon verifying the authentication information, the server 100 may allow the USB device 1000 for the network security to access the server.

In one embodiment, the authentication unit 1300 refers to a chip that stores various information. The authentication unit 1300 may include a user identity module, a subscriber identity module, a universal subscriber identity module, and an embedded subscriber identity module.

The first storage unit 1400 may store therein the operating system and information required for the control unit 1100 to operate, multiple application programs or applications, and instructions for controlling data. At least some of the application programs may be provided from the external server 100 via the wireless communication unit 1200.

In one embodiment, the first storage unit 1400 may be embodied as at least one storage medium selected from a flash memory type, a hard disk type, an solid state disk (SSD) type, a silicon disk drive (SDD) type, a multimedia card micro type, a card type memory (SD or XD memory, etc.), RAM (random access memory), SRAM (static random access memory), ROM (read-only memory), EEPROM (electrically erasable programmable read-only memory), PROM (programmable read-only memory), a magnetic memory, a magnetic disk, and an optical disc.

When the USB device 1000 for network security according to the present disclosure receives data from the server 100 via wireless communication or when the USB device 1000 for network security according to the present disclosure receives data from the computer 200 directly connected to the USB device 1000, the control unit 1100 may store these data in the second storage unit 1500.

In one embodiment, the second storage unit 1500 may include a volatile memory device coupled to the control unit 1500 and a non-volatile memory device coupled to the volatile memory device. In this case, the volatile memory device RAM may function as a buffer to match the data transmission rate via the wireless communication with the data storage rate of the nonvolatile memory device. The volatile memory device may include at least one selected from DRAM, SRAM, etc. The nonvolatile memory device may include a flash memory or the like.

Hereinafter, referring to FIG. 2A, an operation of the transmission controller 1130 of the control unit 1100 will be described in detail.

Figure 2A:
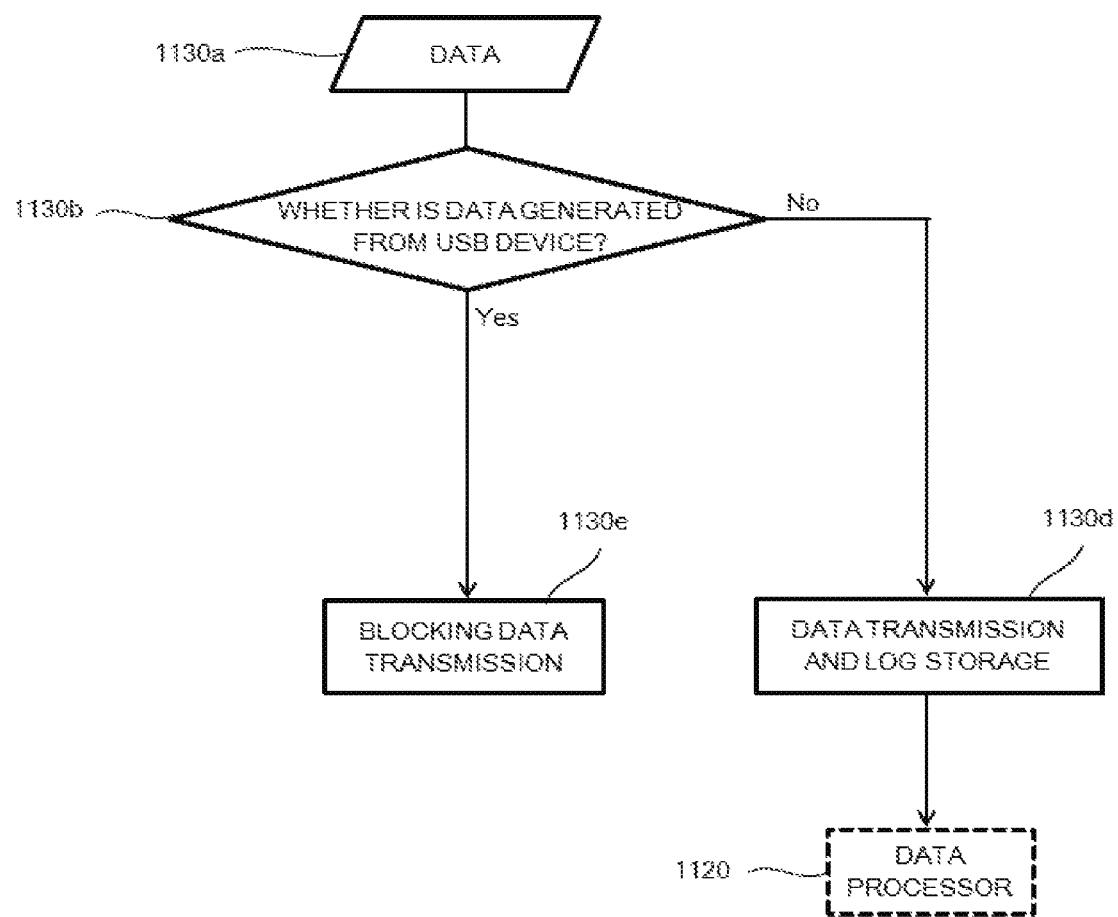

FIG. 2A is a flow chart illustrating a first embodiment of the transmission controller shown in FIG. 1.

Referring to FIG. 2A together with FIG. 1, the transmission controller 1130 may send and receive data to and from the data processor 1120 and the computer 200.

In one embodiment, the transmission controller 1130 according to the first embodiment may include an input unit 1130a, a first determination unit 1130b, a data transmission-disabling unit 1130e, and a first data transmission unit 1130d.

The input unit 1130a may receive data from the computer 200 and the data processor 1120 and provide the data to the first determination unit 1130b.

The first determination unit 1130b determines, based on a first token including identification information among tokens of the data received from the input unit 1130a, whether the corresponding data is generated from the data processor 1120 or is generated from the computer 200. If the corresponding data is generated from the data processor 1120, the corresponding data may be transmitted to the data transmission-disabling unit 1130e. If the corresponding data is data generated from the computer 200, the corresponding data may be transmitted to the data transmission unit 1130d.

The data transmission-disabling unit 1130e blocks transmission of data received from the first determination unit 1130b to the computer 200. The data transmission-disabling unit 1130e may store a log of the blocked data in the second storage unit 1500.

The first data transmission unit 1130d may transmit the data received from the first determination unit 1130b to the data processor 1120 and may store a log of the transmitted data may in the second storage unit 1500.

In this way, the network security can be improved by blocking the transmission of data generated from the USB device 1000 for the network security to the computer 200 using the transmission controller 1130.

FIG. 2B is a flow chart illustrating a second embodiment of the transmission controller shown in FIG. 1.

Referring to FIG. 2B together with FIG. 1, the transmission controller 1130 according to the second embodiment may include an input unit 1130a, a first determination unit 1130b, a second determination unit 1130c, a data transmission-disabling unit 1130e, a first data transmission unit 1130d, a third determination unit 1130h, and a second data transmission unit 1130i.

The input unit 1130a may receive data from the computer 200 and the data processor 1120 and provide the same to the first determination unit 1130b.

The first determination unit 1130b determines, based on a first token including identification information among tokens of data received from the input unit 1130a, whether the corresponding data is data generated from the data processor 1120 or is data generated from the computer 200. If the corresponding data is data generated from the data processor 1120, the corresponding data may be transmitted to the second determination unit 1130c. If the corresponding data is data generated from the computer 200, the corresponding data may be transmitted to the data transmission unit 1130d.

The first data transmission unit 1130*d* may transmit the data received from the first determination unit 1130*b* to the data processor 1120 and may store a log of the transmitted data in the second storage unit 1500. When the second determination unit 1130*c* receives data from the first determination unit 1130*b*, the second determination unit 1130*c* determines, via the data processor 1120, whether allowance of data special transmission from the USB device 1000 for the network security to the computer 200 is set in the first storage unit 1400 or the second storage unit 1500. If the allowance of the data special transmission is not set, the second determination unit 1130*c* transmits the corresponding data to the data transmission-disabling unit 1130*e*. If the allowance of the data special transmission is set, the second determination unit 1130*c* transmits the corresponding data to the third determination unit 1130*h*. When the third determination unit 1130*h* receives the data from the second determination unit 1130*c*, the third determination unit 1130*h* receives a server setting condition for the data special transmission from the server 100 via the wireless communication unit 1200 and the data processor 1120. Then, the third determination unit may determine whether the data received from the second determination unit 1130*c* satisfies the server setting condition. The server setting condition may include one or more conditions selected from data transmission timing, data type, data capacity, and so on. If the data received from the second determination unit 1130*c* satisfies the server setting condition, the third determination unit 1130*h* may transmit the corresponding data to the second data transmission unit 1130*i*. If the received data does not satisfy the server setting condition, the corresponding data may be transmitted to the data transmission-disabling unit 1130*e*.

The second data transmission unit 1130*i* transmits the data received from the third determination unit 1130*h* to the computer 200. The second data transmission unit 1130*i* may store a log of the transmitted data in the second storage unit 1500.

The data transmission-disabling unit 1130*e* blocks the transmission of the data received from the first determination unit 1130*b* and the third determination unit 1130*h* to the computer 200. The data transmission-disabling unit 1130*e* may store a log of blocked data into the second storage unit 1500.

Figure 2C:
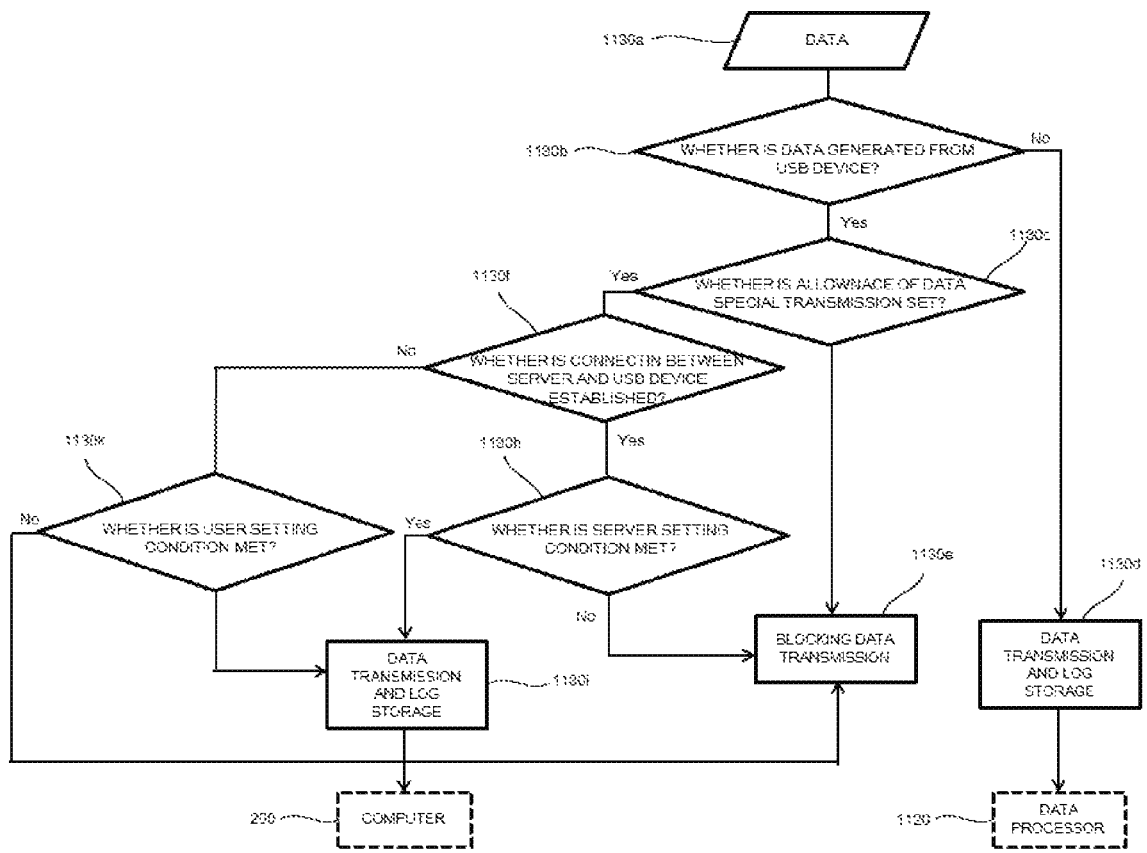

FIG. 2C is a flow chart illustrating a third embodiment of the transmission controller shown in FIG. 1.

Referring to FIG. 2C together with FIG. 1, the transmission controller 1130 according to the third embodiment may include an input unit 1130*a*, a first determination unit 1130*b*, a second determination unit 1130*c*, a data transmission-disabling unit 1130*e*, a first data transmission unit 1130*d*, a third determination unit 1130*h*, a second data transmission unit 1130*i*, a fourth determination unit 1130*f*, and a fifth determination unit 1130*k*.

The input unit 1130*a* may receive data from the computer 200 and the data processor 1120 and provide the same to the first determination unit 1130*b*.

The first determination unit 1130*b* determines, based on a first token including identifying information among tokens of the data received from the input unit 1130*a*, whether the corresponding data is data generated from the data processor 1120 or is data generated from the computer 200. If the corresponding data is data generated from the data processor 1120, the corresponding data may be transmitted to the second determination unit 1130*c*. If the corresponding data is data generated from the computer 200, the corresponding data may be transmitted to the data transmission unit 1130*d*.

The first data transmission unit 1130*d* transmits the data received from the first determination unit 1130*b* to the data processor 1120, and stores a log of the transmitted data in the second storage unit 1500.

When the second determination unit 1130*c* receives the data from the first determination unit 1130*b*, the second determination unit 1130*c* determines, via the data processor 1120, whether allowance of data special transmission from the USB device 1000 for the network security to the computer 200 is set in the first storage unit 1400 or the second storage unit 1500. If the allowance of the data special transmission is not set, the second determination unit 1130*c* transmits the corresponding data to the data transmission-disabling unit 1130*e*. If the allowance of the data special transmission is set, the corresponding data may be transmitted to the fourth determination unit 1130*f*.

When the fourth determination unit 1130*f* receives the data from the second determination unit 1130*c*, the fourth determination unit 1130*f* may determine whether the connection between the server 100 and the USE device 1000 via the wireless communication unit 1200 is established or not. If the connection between the server 100 and the USE device 1000 via the wireless communication unit 1200 is established, the fourth determination unit 1130*f* transmits the corresponding data to the third determination unit 1130*h*. If the connection between the server 100 and the USE device 1000 via the wireless communication unit 1200 is not established, the fourth determination unit 1130*f* may transmit the corresponding data to the fifth determination unit 1130*k*.

When the third determination unit 1130*h* receives the data from the fourth determination unit 1130*f*, the third determination unit 1130*h* receives a server setting condition for the data special transmission from the server 100 via the wireless communication unit 1200 and the data processor 1120. Then, the third determination unit 1130*h* may determine whether the data received from the fourth determination unit 1130*f* satisfies the server setting condition. The server setting condition may include one or more conditions selected from data transmission timing, data type, data capacity, and so on. The third determination unit 1130*h* determines that the data received from the fourth determination unit 1130*f* satisfies the server setting condition, the corresponding data may be transmitted to the second data transmission unit 1130*i*. When the received data does not satisfy the server setting condition, the corresponding data may be transmitted to the data transmission-disabling unit 1130*e*.

When the fifth determination unit 1130*k* receives the data from the fourth determination unit 1130*f*, the fifth determination unit 1130*k* receives a user setting condition from the data processor 1120. Then, the fifth determination unit 1130*k* may determine whether the data received from the fourth determination unit 1130*f* satisfies the user setting condition. The user setting condition may include one or more conditions selected from data transmission timing, data type, data capacity, and so on. When the fifth determination unit 1130*k* determines that the data received from the fourth determination unit 1130*f* satisfies the user setting condition, the corresponding data may be transmitted to the second data transmission unit 1130*i*. If the received data does not satisfy the user setting condition, the corresponding data may be transmitted to the data transmission-disabling unit 1130*e*.

The second data transmission unit 1130*i* transmits the data received from the third determination unit 1130*h* or the fifth determination unit 1130*k* to the computer 200, and stores a log of the transmitted data in the second storage unit 1500.

The data transmission-disabling unit 1130e blocks transmission of the data received from the first determination unit 1130b or the third determination unit 1130h to the computer 200, and stores a log of the blocked data in the second storage unit 1500.

Figure 3:
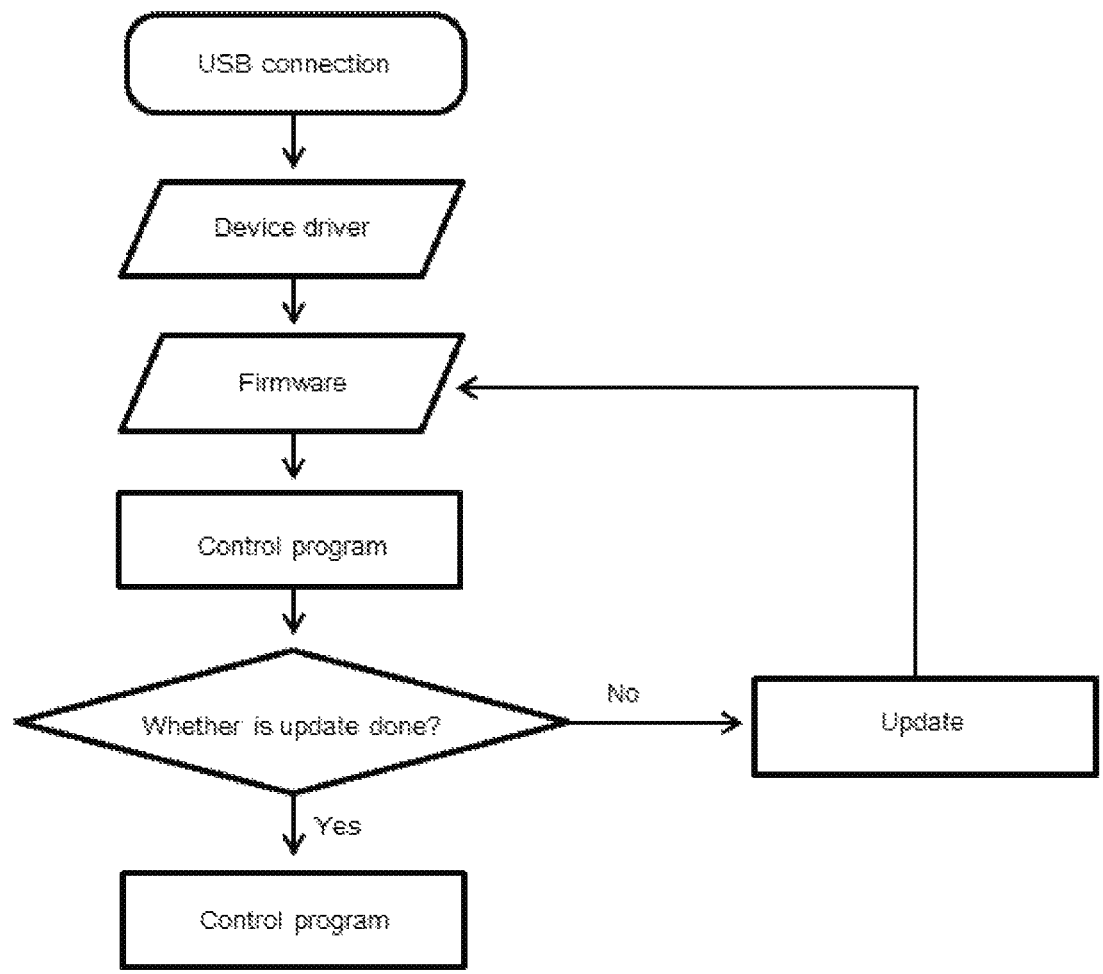
FIG. 3 is a flow chart for illustrating a method for updating firmware of a USB device for network security according to the present disclosure.
Figure 4:
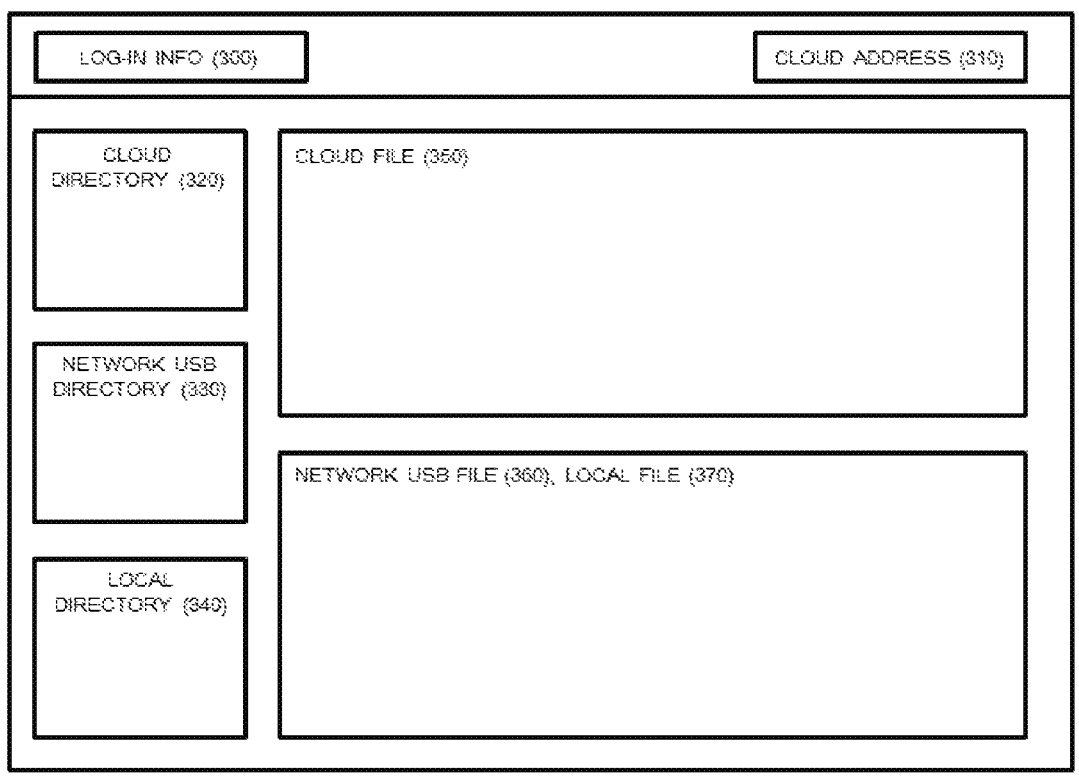
FIG. 4 shows a diagram of a security searcher.

FIG. 3 is a flow chart for illustrating a method for updating firmware of the USB device for network security according to the present disclosure. FIG. 4 shows a diagram of a security searcher.

Referring to FIG. 3 and FIG. 4, when the USB device 1000 for network security according to the present disclosure is connected to the computer 200, the computer 200 may load a driver for driving the USB device 1000 for the network security.

The driver may then read firmware and control program stored in the first storage unit 1400 and determine whether update thereof is required. If the update is required, the driver may update the firmware and control program and store the updated firmware and control program into the first storage unit 1400.

If the update is not required, or if the updated firmware and control program is stored on the first storage unit 1400, the control unit 1100 may open a security searcher window as shown in FIG. 4.

According to the present disclosure, the transmission controller of the control unit may transmit data generated from the computer connected to the USB device to an internal portion of the USB device. However, the transmission controller of the control unit may prevent the internal information generated from the USB device from being transmitted to the computer, although the transmission of the internal data to the computer is allowed only in an exceptional case. Thus, even when the USB device in accordance with the present disclosure is connected to the external computer, the internal information in the USB device may not be recorded on the external computer. This may significantly improve security.

While the present disclosure has been described with reference to preferred embodiments, those skilled in the art will appreciate that the present disclosure may be variously modified and changed without departing from the spirit and scope of the present disclosure set forth in the following claims.

The invention claimed is:

1. A universal serial bus (USB) device for network security, wherein the USB device is configured to be connected to an external information device, the USB device comprising:
   a wireless communication unit configured for transmitting and receiving data to and from an external server in a wireless communication manner;
   a first storage medium configured for storing a driving program, a driving application, or a driving command therein;
   a second storage medium configured for storing data received from the external information device and the server therein; and
   a control unit configured for controlling the wireless communication unit, the first medium and the second storage medium using the driving program, the driving application, or the driving command,
   wherein the control unit comprises:
      a communication controller configured for controlling wireless communication between the wireless communication unit such that the USB device performs data communication with the server;
      a data processor configured for controlling a data processing operation using the driving program, the driving application or the driving command, or using an application program or an application supplied from the external information device; and
      a transmission controller configured for receiving data from the external information device under control of the data processor and selectively allowing or disallowing data transmission from the data processor to the external information device,
   wherein the transmission controller comprises:
      an input unit configured for receiving data from the external information device or the data processor;
      a first processor configured for determining, based on a first token including identifying information among tokens of the data received from the input unit, whether the received data is generated from the data processor or from the external information device;
      a second processor configured for receiving the data from the first processor and for determining whether allowance of data transmission to the external information device is set in the first storage medium or the second storage;
      a third processor configured for receiving the data from the second processor, and for receiving a server setting condition for the data transmission from the server via the wireless communication unit, and then for determining whether the data received from the second processor satisfies the server setting condition;
      data transmitter controller configured for blocking transmission of the data received from the first processor or the third processor to the external information device and for storing a log of the transmission-blocked data in the second storage medium;
      a first data transmitter configured for transmitting the data received from the first processor to the data processor, and for storing a log of the transmitted data in the second storage medium; and
      a second data transmitter configured for transmitting the data received from the third processor to the external information device and for storing a log of the transmitted data in the second storage medium,
   wherein when the first processor determines that the data received from the input unit is generated from the external information device, the first processor transmits the corresponding data to the first data transmitter,
   wherein when the first processor determines that the data received from the input unit is generated from the data processor, the first processor transmits the corresponding data to the second processor,
   wherein when the second processor determines that the allowance of the data transmission is not set, the second processor transmits the corresponding data to the data transmitter controller;
   wherein when the second processor determines that the allowance of the data transmission is set, the second processor transmits the corresponding data to the third processor,
   wherein when the third processor determines that the data received from the second processor satisfies the server setting condition, the third processor transmits the corresponding data to the second data transmission unit, wherein when the third processor determines that the data received from the second processor does not satisfy the server setting condition, the third processor transmits the corresponding data to the data transmitter controller, and wherein the server setting condition includes at least one selected from a group consisting of data transmission timing, data type, and data capacity.

2. The USB device of claim 1, further comprising an authentication unit configured for storing authentication information therein, wherein the control unit transmits the authentication information to the server via the wireless communication unit to access the server, wherein upon confirming the authentication information, the server allows the USB device to connect thereto.

3. The USB device of claim 2, further comprising an authentication unit configured for storing authentication information therein, wherein the control unit transmits the authentication information to the server via the wireless communication unit to access the server, wherein upon confirming the authentication information, the server allows the USB device to connect thereto.

4. The USB device of claim 1, further comprising an authentication unit configured for storing authentication information therein, wherein the control unit transmits the authentication information to the server via the wireless communication unit to access the server, wherein upon confirming the authentication information, the server allows the USB device to connect thereto.

* * * * *